United States Patent
Mattice et al.

(10) Patent No.: US 7,462,103 B2
(45) Date of Patent: Dec. 9, 2008

(54) GAMING SYSTEM FOR INDIVIDUAL CONTROL OF ACCESS TO MANY DEVICES WITH FEW WIRES

(75) Inventors: Harold Mattice, Gardnerville, NV (US); Richard Wilder, Sparks, NV (US); Theodore Gail, Sparks, NV (US)

(73) Assignee: IGT, Reno, NV (US)

(*) Notice: Subject to any disclaimer, the term of this patent is extended or adjusted under 35 U.S.C. 154(b) by 447 days.

(21) Appl. No.: 09/814,638

(22) Filed: Mar. 22, 2001

(65) Prior Publication Data
US 2004/0198493 A1 Oct. 7, 2004

(51) Int. Cl.
*A63F 9/24* (2006.01)
*A63F 13/00* (2006.01)
*G06F 17/00* (2006.01)
*G06F 19/00* (2006.01)

(52) U.S. Cl. ............ 463/36; 273/118; 273/119; 273/121; 340/40; 340/35

(58) Field of Classification Search ............ 463/1, 463/40–42, 36; 700/1, 2, 9, 12, 19; 709/220, 709/251, 252
See application file for complete search history.

(56) References Cited

U.S. PATENT DOCUMENTS

| | | | | |
|---|---|---|---|---|
| 3,582,071 A | * | 6/1971 | Grosvenor et al. | 473/70 |
| 3,675,196 A | * | 7/1972 | Molloy et al. | 340/912 |
| 3,931,966 A | * | 1/1976 | Walker | 473/65 |
| 4,271,408 A | * | 6/1981 | Teshima et al. | 345/83 |
| 4,367,464 A | * | 1/1983 | Kurahashi et al. | 345/22 |
| 4,455,562 A | * | 6/1984 | Dolan et al. | 347/130 |
| 4,623,920 A | * | 11/1986 | Dufresne et al. | 380/240 |
| 4,648,600 A | * | 3/1987 | Olliges | 463/20 |
| 4,712,214 A | * | 12/1987 | Meltzer et al. | 714/748 |

(Continued)

FOREIGN PATENT DOCUMENTS

CA 2272499 A1 * 11/1999

OTHER PUBLICATIONS

PlantWeb-Fieldbus, Wiring Methods [online]. [retrieved on Jul. 16, 2002]. Retrieved from the Internet <URL: http://www.ermersonprocess.com/plantweb/fieldbus/fb_impl_wiring.html>.*

(Continued)

*Primary Examiner*—Robert E Pezzuto
*Assistant Examiner*—Paul A. D'Agostino
(74) *Attorney, Agent, or Firm*—George H. Gerstman; Seyfarth Shaw LLP

(57) ABSTRACT

A system controls access to plural devices with only four lines by grouping the devices in nodes, each node including a predetermined number of the devices and a local control circuit defining a shift register with positions respectively connected to the devices. The nodes are connected in series with a host controller, to form a system shift register. The nodes are serially addressed by a serial data message from a DATA OUT line of the host controller, which message includes M×N data bits followed by a strobe indicator, where N is the number of nodes and M is the number of devices at each node. All controllers are connected to a V+ line and a COMMON line and a RETURN line. The system register forms a fourth line, with one end connected to the host controller DATA OUT terminal and the other end connectable to the RETURN line.

19 Claims, 4 Drawing Sheets

U.S. PATENT DOCUMENTS

| | | | |
|---|---|---|---|
| 4,901,277 A * | 2/1990 | Soloway et al. | 709/233 |
| 4,935,866 A * | 6/1990 | Sauvajol et al. | 709/201 |
| 4,980,780 A * | 12/1990 | Tanaka | 358/401 |
| 5,008,905 A * | 4/1991 | Lee et al. | 377/77 |
| 5,021,942 A * | 6/1991 | Watson et al. | 712/201 |
| 5,095,417 A * | 3/1992 | Hagiwara et al. | 700/9 |
| 5,319,360 A * | 6/1994 | Schrodi et al. | 370/390 |
| 5,333,114 A * | 7/1994 | Warrior et al. | 340/310.01 |
| 5,333,135 A * | 7/1994 | Wendorf | 370/394 |
| 5,420,482 A * | 5/1995 | Phares | 315/292 |
| 5,450,419 A * | 9/1995 | Hagiawara | 714/746 |
| 5,606,558 A * | 2/1997 | Daniel et al. | 370/395.7 |
| 5,633,629 A * | 5/1997 | Hochstein | 340/907 |
| 5,812,105 A * | 9/1998 | Van de Ven | 345/83 |
| 5,820,459 A * | 10/1998 | Acres et al. | 463/16 |
| 5,836,676 A * | 11/1998 | Ando et al. | 362/244 |
| 5,890,715 A * | 4/1999 | Gomez et al. | 273/118 A |
| 5,909,368 A * | 6/1999 | Nixon et al. | 700/131 |
| 5,974,553 A * | 10/1999 | Gandar | 713/300 |
| 5,999,808 A * | 12/1999 | LaDue | 235/380 |
| 6,031,343 A * | 2/2000 | Recknagel et al. | 315/292 |
| 6,069,597 A * | 5/2000 | Hansen | 345/74.1 |
| 6,117,010 A * | 9/2000 | Canterbury et al. | 463/20 |
| 6,192,281 B1 * | 2/2001 | Brown et al. | 700/17 |
| 6,195,591 B1 * | 2/2001 | Nixon et al. | 700/19 |
| 6,251,014 B1 * | 6/2001 | Stockdale et al. | 463/16 |
| 6,263,392 B1 * | 7/2001 | McCauley | 463/25 |
| 6,331,756 B1 * | 12/2001 | Belliveau | 315/316 |
| 6,370,448 B1 * | 4/2002 | Eryurek | 700/19 |
| 6,383,076 B1 * | 5/2002 | Tiedeken | 463/40 |
| 6,394,900 B1 * | 5/2002 | McGlone et al. | 273/142 R |
| 6,411,987 B1 * | 6/2002 | Steger et al. | 700/9 |
| 6,427,147 B1 * | 7/2002 | Marquis | 707/4 |
| 6,454,649 B1 * | 9/2002 | Mattice et al. | 463/17 |
| 6,577,080 B2 * | 6/2003 | Lys et al. | 315/362 |
| 6,608,453 B2 * | 8/2003 | Morgan et al. | 315/312 |
| 6,609,091 B1 * | 8/2003 | Budzinski | 704/9 |
| 6,668,344 B1 * | 12/2003 | Sakata et al. | 714/710 |
| 6,718,497 B1 * | 4/2004 | Whitby-Strevens | 714/739 |
| 6,720,745 B2 * | 4/2004 | Lys et al. | 315/312 |
| 6,777,891 B2 * | 8/2004 | Lys et al. | 315/291 |
| 6,865,632 B1 * | 3/2005 | Johas Teener | 710/240 |
| 6,885,664 B2 * | 4/2005 | Ofek et al. | 370/372 |
| 6,889,226 B2 * | 5/2005 | O'Neil et al. | 707/100 |
| 7,161,313 B2 * | 1/2007 | Piepgras et al. | 315/318 |
| 7,191,266 B1 * | 3/2007 | Brown | 710/104 |
| 7,202,613 B2 * | 4/2007 | Morgan et al. | 315/312 |
| 7,242,152 B2 * | 7/2007 | Dowling et al. | 315/291 |
| 7,253,566 B2 * | 8/2007 | Lys et al. | 315/291 |
| 7,292,209 B2 * | 11/2007 | Rast | 345/82 |
| 7,358,929 B2 * | 4/2008 | Mueller et al. | 345/1.3 |
| 2001/0038628 A1 * | 11/2001 | Ofek et al. | 370/392 |
| 2002/0108055 A1 * | 8/2002 | Okaue | 713/200 |
| 2002/0115487 A1 * | 8/2002 | Wells | 463/42 |
| 2003/0053456 A1 * | 3/2003 | Li | 370/390 |
| 2003/0057886 A1 * | 3/2003 | Lys et al. | 315/291 |
| 2003/0057887 A1 * | 3/2003 | Dowling et al. | 315/291 |
| 2006/0025897 A1 * | 2/2006 | Shostak et al. | 701/1 |
| 2008/0088258 A1 * | 4/2008 | Ng | 315/294 |

OTHER PUBLICATIONS

Valentino, George J., IEEE-1394: An Emerging Interconnection System for Future Simulations, 1998, SYSTRAN Corporation, pp. 1-9.*
Creating One Industry Standard for Manufactures of Electronic Games of Chance, North American Gaming Regulators Association, May 23, 2000, pp. 1-65.*
Universal Serial Bus, http://en.wikipedia.org/wiki/Usb, p. 6.*

* cited by examiner

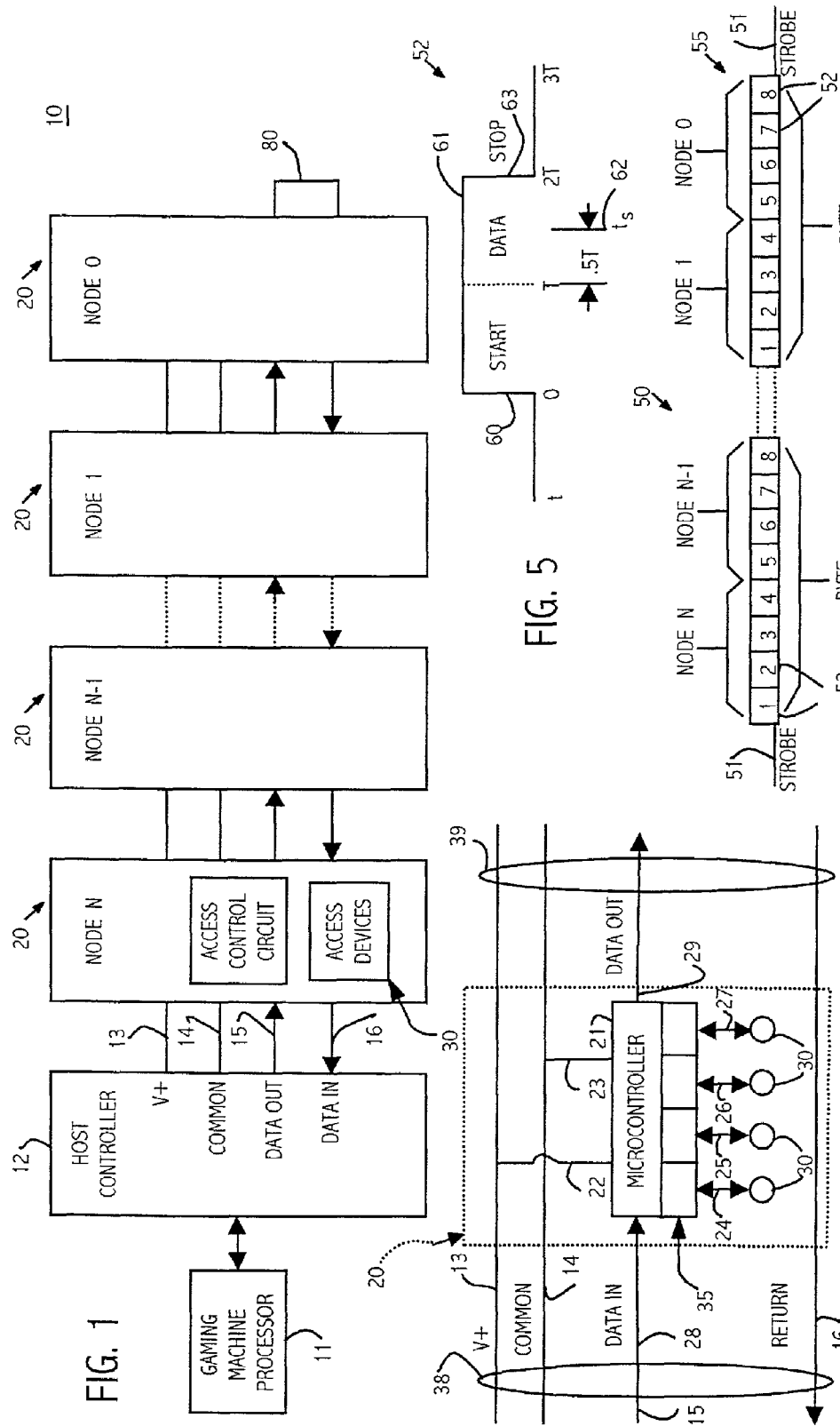

GAMING SYSTEM FOR INDIVIDUAL CONTROL OF ACCESS TO MANY DEVICES WITH FEW WIRES

BACKGROUND

This application relates to apparatus and methods for controlling, and/or sensing, the states of multiple components or devices, and has particular application to devices of the types used in or in connection with gaming machines.

In electronic gaming machines, of the type commonly used in gaming establishments, it is desirable to provide devices and techniques for attracting players and providing an entertaining play environment. To this end, gaming machines commonly use light displays, which can be operated in a variety of modes, including an attract mode. For this purpose, a plurality of individual lights, which may number from tens to hundreds for an individual machine, are blinked on and off in predetermined patterns, depending upon the mode of operation of the machine. Such lights may be in the form of light-emitting diodes (LEDs) and may form part of an illuminated switch, which includes a switch mechanism and one or more associated LEDs. Such LEDs may be provided in a variety of colors.

It is possible to connect groups of such devices, e.g., like-colored lights, in parallel in order to reduce the number of wires required for controlling them. However, in order to maximize the number of different display patterns which can be generated, it is desirable to have the devices individually controlled, but this may require a very large number of wires. For example, in the case of LEDs, there would have to be one control wire for each LED and a common wire. In the case of illuminated switches, even more wires would be required. For example, in a machine panel with fourteen illuminated switches, a minimum of thirty wires would be required (switch common, lamp common, fourteen switch control wires and fourteen lamp control wires), and this assumes that there is only one lamp per switch or, if multiple lamps per switch, that all the lamps of a switch are connected in parallel. Accordingly, in machines with large numbers of such devices to be controlled, individual control of the devices becomes impractical.

SUMMARY

There is disclosed in this application an apparatus and method for controlling and/or sensing, the states of multiple devices, which avoids the disadvantages of prior apparatus and methods while affording additional structural and operating advantages.

One aspect is the provision of an apparatus and method of the type set forth which permits individual control and/or sensing of a large number of devices, while minimizing the number of electrical wires or conductors that are required.

Another aspect is the provision of an apparatus and method of the type set forth, which can be used with different types of devices, including those having states which are to be controlled, and those having states which are to be detected.

In connection with the foregoing aspects, another aspect is the provision of an apparatus and method of the type set forth which utilizes distributed processing techniques.

Certain ones of these and other aspects may be attained by providing a gaming machine comprising a plurality of devices to be individually accessed; a host controller having a data out terminal a power terminal and a common terminal; a plurality of local controllers each having a data in terminal, a data out terminal, a power terminal, a common terminal and plural device terminals, the controllers being interconnected in a string with the data out terminal of the host controller being connected to the data in terminal of a first local controller and the data in terminal of each of the other local controllers being connected to the data out terminal of the preceding local controller in the string, each local controller having its device terminals respectively connected to individual ones of the devices; a power line interconnecting the power terminals of the host controller and all of the local controllers; and a common line interconnecting the common terminals of the host controller and all of the local controllers.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 1 is a functional block diagrammatic view of an embodiment of apparatus for individually accessing a plurality of devices arranged in a number of nodes;

FIG. 2 is a simplified, partially schematic and partially functional block diagram of one of the nodes of the apparatus of FIG. 1;

FIG. 4 is a diagrammatic illustration of a data stream filling a shift register formed by the nodes of FIG. 1;

FIG. 5 is a diagram of one of the data bits of the data stream of FIG. 4;

DETAILED DESCRIPTION

Figure 3:
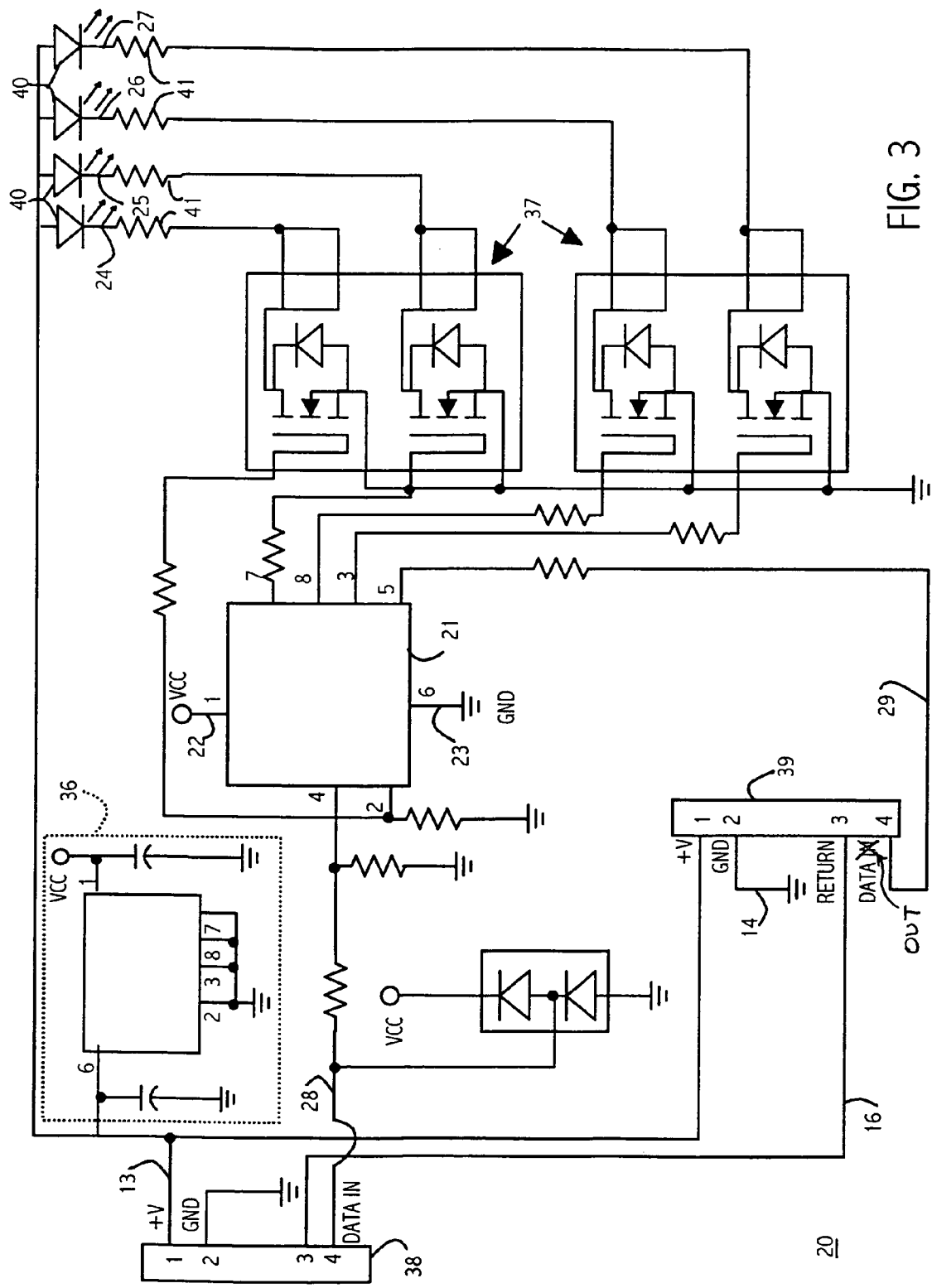
FIG. 3 is a schematic circuit diagram of an embodiment of the node of FIG. 2.

Referring to FIG. 1, there is illustrated a system, generally designated by the numeral 10, for controlling access to a plurality of devices with a minimum number of wires or lines. The system 10 may be embodied in a gaming machine, which includes a gaming machine processor 11 for controlling all of the basic functions of the gaming machine in a known manner. The system 10 also includes a host controller 12 configured to provide a V+ voltage level at an output terminal connected to a V+ line 13, and also having a COMMON terminal connected to a common line 14. The controller 12 generates data signals at a DATA OUT terminal connected to a DATA line 15 and is adapted to receive incoming data via a RETURN line 16 at a DATA IN terminal. The host controller 12 is configured to control access to a plurality of devices 30, which may be of various types, and which are grouped together in nodes 20, which are connected in a string to the first controller 12. There may be any number of nodes 20, depending upon the application. In the illustrated embodiment only the first two (nodes 0 and 1) and the last two (nodes N-1 and N) are illustrated. The nodes 20 may all be of substantially the same construction.

Referring to FIG. 2, each node 20 includes a microcontroller 21 having a VCC terminal 22 coupled to the V+ line 13, a COMMON terminal 23 connected to the COMMON line 14, four device terminals 24, 25, 26 and 27, a DATA IN terminal 28 and a DATA OUT terminal 29. The device terminals 24-27 are respectively connected to four of the devices 30. The microcontroller 21 includes a 4-bit shift register 35, the positions of which are respectively connected to the device terminals 24-27. While, in the illustrated embodiment, there are only four devices 30 included in each node 20, it will be appreciated that different numbers of devices could be included in each node, depending upon the capacity of the microcontroller 21. As was indicated above, the number of nodes 20 in the system 10 will depend upon the total number of devices 30 to be accessed. In the illustrated embodiment, for example, with four devices per node, if there were 32 devices to be accessed, this would require eight nodes.

Further details of the node 20 are illustrated in FIG. 3. The microcontroller 21 is an 8-pin device, which may be a 12C508 or 12C509, the pins 2, 3, 7 and 8 respectively corresponding to the device terminals 24-27. The node 20 includes a power supply 36 coupled to the V+ line 13 for providing a VCC voltage to the micro controller 21 at its VCC terminal 22 (pin 1). Pin 6 is the COMMON terminal 23 connected to the COMMON line 14. (see FIG.2).The node has a Data IN terminal 28 connected through a resister to pin 4, and pin 5 is connected through a resister to a DATA OUT terminal 29. The device pins 2, 7, 8 and 3 are, respectively, connected through resisters to transistor drivers 37 which are, in turn, connected through resisters 41 to the device terminals 24-27 which are, respectively, connectable to devices to be accessed. In the embodiment illustrated in FIG. 3, the devices are LEDs 40, the device terminals 24-27 being respectively connected to the cathodes of the LEDs, their anodes being connected to the V+ line 13. The node 20 is provided with 4-pin input and output connectors 38 and 39. Each connector 38 and 39 is connected to the V+ line 13, the COMMON or ground line 14 and the RETURN line 16. The fourth pin of the input connector 38 is connected to the DATA IN terminal 28, while the fourth pin of the output connector 39 is connected to the DATA OUT terminal 29.

When the nodes are interconnected in a series string, as illustrated in FIG. 1, the input connector 38 of the node N is connected to an associated connector of the host controller 12 having pins corresponding to the lines 13-16, while the input connector 38 of each of the other nodes in the string is connected to the output connector 39 of the immediately preceding node in the string. Each node 20 has a path from its DATA IN terminal to is DATA OUT terminal and these paths are connected in series with one another and with the DATA OUT terminal of the host controller 12 to make up the fourth line 15. The output connector 39 of node 0 (the last node in the string, i.e., the farthest from the host controller 12) is not connected to any other connector.

In order to access the devices 30, the host controller 12 generates at its DATA OUT terminal and transmits to all of the nodes 20 a serial data signal, generally designated 50 and illustrated in FIG. 4, which includes four bits 52 of data for each node in the string. Thus, for example, if there were eight nodes, the data signal 50 would include 32 bits of information, followed by a strobe indicator 51, which may be a low level persisting for a pre-determined time period. In the illustrated embodiment the host controller 12 may have an 8-bit data bus, so the data bits 52 are arranged in 8-bit bytes 53, with each byte addressing two consecutive nodes in the string, i.e., an even-numbered node and odd-numbered node. It will be appreciated that, when the nodes 20 are connected together in the manner illustrated in FIG. 1, the shift registers 35 of the several nodes cooperate to form a systems shift register 55 of length M×N, where N is the number of nodes in the string and M is the number of devices 30 connected to each node.

The serial data signal 50 begins with the byte for nodes 0 and 1 and the bits are sequentially stepped through the system shift register 55. When the entire serial data message of M×N bits has been transmitted, it will completely fill the system shift register 55, as illustrated in FIG. 4. The strobe indicator 51 then follows the string of data bits 52 and, as it is received at each node, if the node is of the type illustrated in FIG. 3, it causes the node microcontroller 21 to latch the contents of its shift register 35 to the associated device terminals 24-27 for controlling the states of the associated devices 30, in this case LEDs 40. For example, if bit no. 1 for a node 20 is a logic "1" it may control the associated device to one state and if it is a logic "0" it may control the device to the other state. In the case of LEDs 40, the logic "1" state may be ON and the logic "0" state may be OFF.

Referring to FIG. 5, each data bit 51 in the serial message 50 is made up of three equal-length segments. The bit starts with a line high at 60 to indicate a START segment having a length of T, followed by a DATA segment 61, which also has a length T, and then followed by a line low STOP segment 63, which also has a length T, so that the total length of the data bit 52 is 3T. The DATA segment 61 may, of course, be either a line high or a line low condition, depending upon the logic state being transmitted in that data bit, but the data bit 52 will always have the same length 3T, irrespective of its message content. When the START segment 60 is detected by the microcontroller 21 of a node, a timer is started which times out at 0.5T after the end of the START segment 60 at a time 62, at which time the microcontroller samples the DATA segment 61 to determine its level. This ensures that the DATA segment 61 will always be sampled substantially in the middle of its length, minimizing the chance of confusion with the START and STOP segments.

Figure 6:
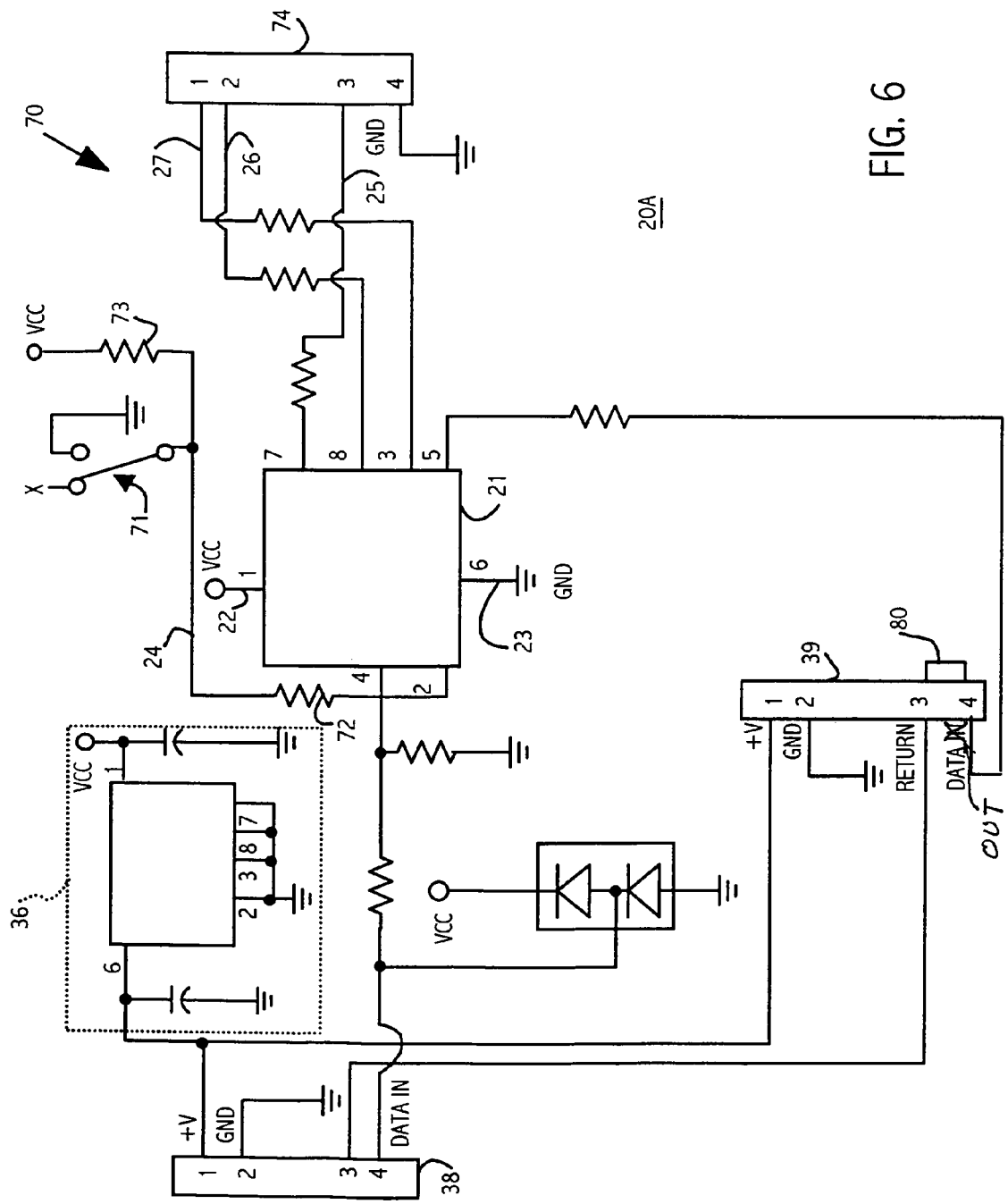
FIG. 6 is a schematic circuit diagram of another embodiment of the node of FIG. 2.

Referring to FIG. 6, there is illustrated an alternative embodiment of a node, designated 20A, configured for connection to a device 30 having states to be detected or monitored, such as an illuminated manual switch 70. In the illustrated embodiment the switch 70 includes a switch element 71, which may be a single-pole, double-throw switch, the movable contact of which is connected to one of the device terminals 24 and through a resistor 72 to the microcontroller 21 and, through a resistor 73, to the VCC supply voltage. One of the fixed contacts of the switch is connected to the COMMON terminal 23, while the other is disconnected. The switch 70 includes three LEDs (not shown), which are respectively connected to the other three device terminals 25-27 through three of the pins of a 4-pin connector 74, the fourth pin of which is connected to the COMMON terminal 23 (COMMON line 13). The LEDs 40 may have different colors, such as blue, green, and red, or may be of the same color.

In this embodiment, when the strobe indicator 51 reaches the node 20A, the microcontroller 21 responds by sampling the states of the four devices connected to its device terminals (i.e., the switch element 71 and the three LEDs) and loads them into the corresponding positions of its shift register 35. In this embodiment, wherein the states of the connected devices are to be sensed, rather than controlled, the data content of the local shift register 35 at the time of arrival of the strobe indicator 51 is unimportant. In this embodiment, the drivers 37 of the node 20 have been eliminated.

Figure 7:
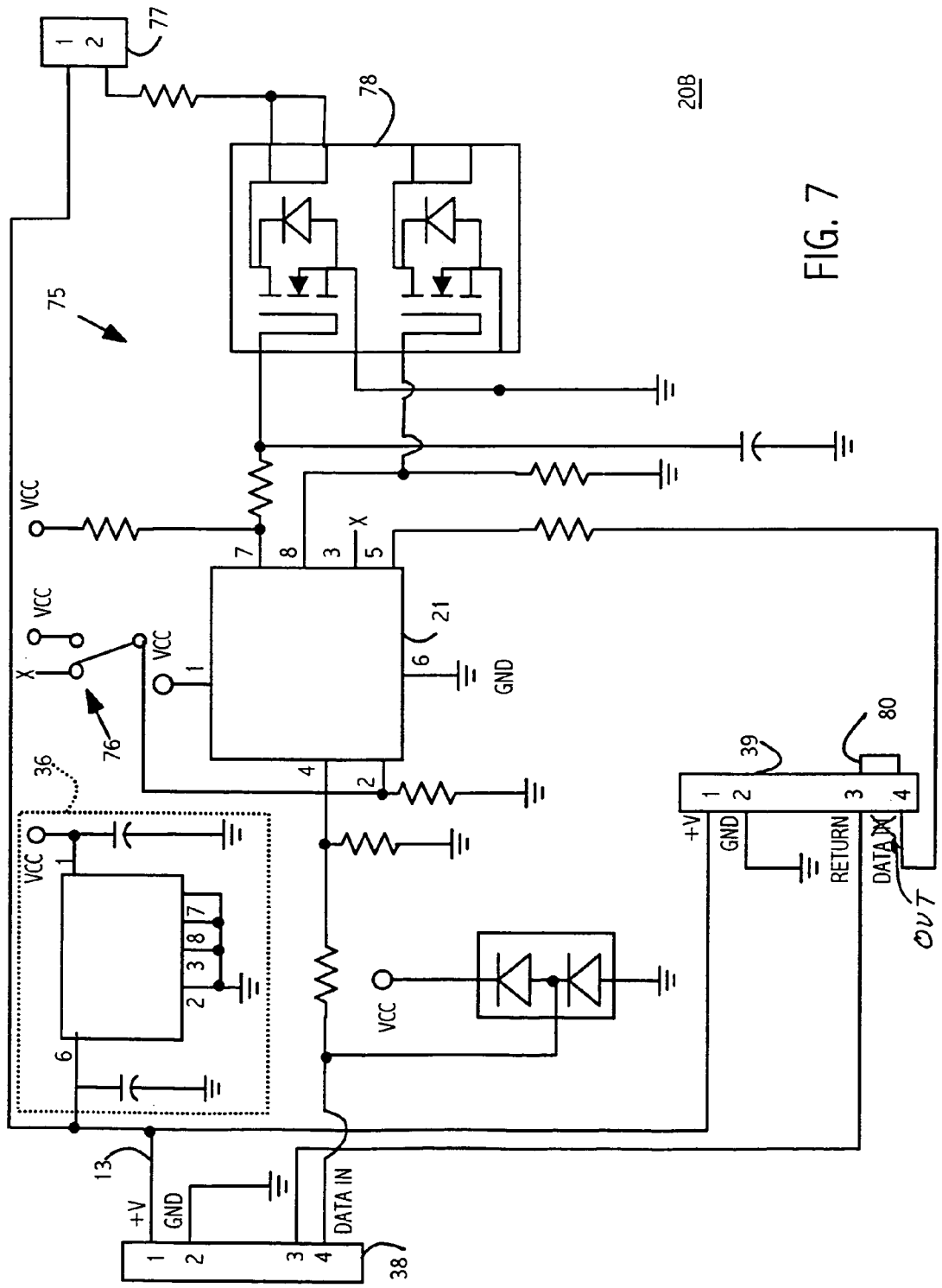
FIG. 7 is a schematic circuit diagram of yet another embodiment of the node of FIG. 2.

Referring to FIG. 7, there is illustrated another node embodiment 20B, which is similar to the node embodiment 20A of FIG. 6, except in this case the accessed devices of the node include an illuminated switch 75 having a switch element 76 and a single lamp 77. In this case, the VCC supply voltage is connected to one of the fixed contacts of the switch element 76. The lamp (not shown) is connected to a 2-pin connector 77, one pin of which is connected to the V+ line 13, and the other pin of which is connected to a driver circuit 78, which is in turn connected to two of the device pins 7 and 8, of the microcontroller 21, the fourth device pin three being disconnected. The node 20B operates on substantially the same manner as described for the node 20A.

When any of the nodes in the system 10 is connected to a device having states which must be sensed or monitored, such as the switches 70 or 75 illustrated in FIGS. 6 and 7, those states must be communicated back to the host controller 12 along the RETURN line 16. For this purpose, the DATA OUT pin of the output connector 39 of the node zero (the last node in the string) is connected to its RETURN pin by a jumper 80 (see FIGS. 1, 6 and 7). This jumper is illustrated in FIGS. 3, 6 and 7 to show its position, but it will be appreciated that it will be used only if that node happens to be the node 0, i.e., the last in a string or the further from the host controller 12. It will also be appreciated that, if any node has a device with states which must be sensed, the jumper 80 must be utilized in node 0 to complete a return path to the host controller 12.

It can be seen that, with the foregoing arrangement, no more than four lines are required to control access to the plurality of devices in the gaming machine. Indeed, if all of the nodes are of the type illustrated in FIG. 3, wherein all four of the devices of the node are LEDs 40 or some other device of the type having states to be controlled, but not requiring any sensing or monitoring of the states, only three lines are required, and, therefore, the jumpers 80 would not be connected.

Where the devices 30 connected to one or more of nodes 20 include devices having states which are to be sensed or recorded, such as switches 70 or 75, the states recorded in the shift register 55 must be returned to the host controller 12. In this regard, when the next serial data message 50 arrives at the node N, immediately following the strobe indicator 51 which ended the current message, the first bit addressed to node 0 enters the first position of the shift register 35 of node N, shifting the contents of the register 35 one position to the right, so that the bit in the fourth register position moves out on the DATA OUT line 15 to the next node, shifting the contents of its register 35, and so forth, with the last bit in the register for node 0 being shifted out onto the RETURN line 16 via the jumper 80. As each successive bit of the new serial message arrives at the node N, this shifting process continues until the entire contents of the register 55 (FIG. 4) have been shifted out to the host controller 12, at which time the register 55 is filled with the new serial message.

While the foregoing description has related to the control devices such as LEDs and illuminated switches, the basic principles of the invention could be applied to control of any of a large number of dual-state devices. Also, while the apparatus has particular application to control of access to large numbers of devices, it could be utilized for control of any number of devices. While the apparatus has been described in the context of control of a number of devices in a single location, such as a gaming machine, the principles described above would also be applicable to control of a number of devices at distributed locations.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A gaming system comprising:
   a plurality of devices to be individually accessed, arranged in a string of N nodes having first and second spaced ends, with each node including up to M of the devices, wherein M and N are whole numbers greater than one;
   a host controller directly connected to only the first end of the string and having a data out terminal;
   a plurality of local controllers respectively associated with the nodes;
   each local controller having a data in terminal and a data out terminal and including a M-bit shift register with the register positions respectively connected to device output terminals to which the devices of the associated node may respectively be connected;
   the data out terminal of the host controller being connected to the data in terminal of a first node and the data in terminal of each of the other nodes being connected to the data out terminal of the preceding node in the string so that the string of nodes provides a (M×N)-bit shift register;
   the host controller producing at its data out terminal a position-based output signal comprising a serial digital data stream including M×N bits followed by a strobe indicator so that the M×N bits are sequentially loaded into and respectively fill the positions of the (M×N)-bit register, wherein the bits received by a node are determined by the position of the node in the string; and
   each local controller being responsive to the strobe indicator for utilizing the contents of its M-bit shift register for accessing the associated devices.

2. The gaming system of claim 1, wherein each of the local controllers is a microcontroller.

3. The gaming system of claim 1, wherein the serial digital data stream comprises binary data.

4. The gaming system of claim 1, wherein the devices include at least one device having states which are to be controlled, each local controller being responsive to the strobe indicator for latching the contents of its register to those of its device output terminals connected to the at least one device for controlling states of at the least one device.

5. The gaming system of claim 4, wherein the at least one device is an LED.

6. The gaming system of claim 1, wherein the devices include at least one device having states which are to be recorded, each local controller being responsive to the strobe indicator, for each register position connected to the at least one device, for loading into that register position a bit indicative of the current state of the at least one device.

7. The gaming system of claim 6, wherein the at least one device is a switch.

8. The gaming system of claim 1, wherein the output signal is comprised of bytes each having at least one M-bit segment.

9. The gaming system of claim 8, wherein consecutive M-bit segments of a byte respectively address consecutive nodes.

10. A gaming system comprising:
    a plurality of devices to be individually accessed including one or more first devices to be sensed and one or more second devices to be controlled, the devices being arranged in a string of N nodes having first and second spaced ends, with each node including up to M of the devices, wherein M and N are whole numbers greater than one;
    a host controller directly connected to only the first end of the string and having a data out terminal and a data in terminal;

a plurality of local controllers respectively associated with the nodes;

each local controller having a data in terminal and a data out terminal and including a M-bit shift register with the register positions respectively connected to device output terminals to which the devices of the associated node may respectively be connected;

the data out terminal of the host controller being connected to the data in terminal of a first node and the data in terminal of each of the other nodes being connected to the data out terminal of the preceding node in the string so that the string of nodes provides a (M×N)-bit shift register, and the data out terminal of a last node being connected to only the data in terminal of the host controller;

the host controller producing at its data out terminal a position based output signal comprising a serial digital data stream including M×N bits followed by a strobe indicator so that the M×N bits to be sequentially loaded into and respectively fill the positions of the (M×N)-bit register, wherein the bits received by a node are determined by the position of the node in the string, and each local controller being responsive to the strobe indicator for: (a) for each of its register positions connected to a first device, loading into that register position a bit indicative of the current state of the first device; and (b) for each of its register positions connected to a second device, latching the contents of that position to its associated device output terminal for controlling the associated second device.

11. The gaming system of claim 10, wherein the output signal comprises binary data.

12. The gaming system of claim 10, wherein each of the first devices is a switch and each of the second devices is an LED.

13. The gaming system of claim 10, wherein the contents of the (M×N)-bit register is returned to the data in terminal of the host controller in response to the loading into the (M×N)-bit register of an output signal from the host controller.

14. The gaming system of claim 10 wherein all of the devices are associated with a single gaming machine.

15. A method for individually accessing each of a plurality of devices in a gaming system comprising:

grouping the devices into a string of N nodes having first and second spaced ends, with each node including a local controller forming a M-bit shift register and up to M devices respectively connected to device terminals respectively connected to the register positions of the local controller, wherein M and N are whole numbers greater than one;

connecting the local controllers in series with one another and with a data out terminal of a host controller directly connected to only the first end of the string so that the local controllers cooperate to define an (M×N)-bit shift register;

providing a power line connected to all of the controllers and a common line connected to all of the controllers, and transmitting from the host controller data out terminal to all of the local controllers a position based serial digital data message including M×N bits respectively corresponding to the devices for individually controlling the devices so that the M×N bits respectively occupy the M×N positions of the shift register, wherein the bits received by a node are determined by the position of the node in the string.

16. The method of claim 15, wherein the data message terminates with a strobe indicator which causes each local controller to access the devices connected thereto in accordance with bits of the data message corresponding to that local controller.

17. The method of claim 15, wherein the devices include at least one device having states which are to be sensed, and further comprising sensing the current state of the at least one device, and returning to the host controller from each node a signal indicative of the current state of the at least one device.

18. The method of claim 17, wherein each digital data message terminates with a strobe indicator, and each local controller responds to the strobe indicator for storing, for each at least one device connected thereto, a data bit corresponding to the current state of the at least one device, the stored bits being shifted from the register in response to a next data message from the host controller.

19. The method of claim 15, wherein the devices include at least one device having states which are to be controlled, and further comprising controlling the states of the at least one device in response to the data message.

* * * * *